(12) United States Patent
Ritter

(10) Patent No.: US 7,711,356 B2
(45) Date of Patent: May 4, 2010

(54) METHOD AND SYSTEM FOR AUTOMATED CALL DIVERSION

(75) Inventor: Rudolf Ritter, Zollikofen (CH)

(73) Assignee: Swisscom Mobile AG, Bern (CH)

( * ) Notice: Subject to any disclaimer, the term of this patent is extended or adjusted under 35 U.S.C. 154(b) by 694 days.

(21) Appl. No.: 11/569,259

(22) PCT Filed: May 19, 2005

(86) PCT No.: PCT/EP2005/052317

§ 371 (c)(1),
(2), (4) Date: Nov. 17, 2006

(87) PCT Pub. No.: WO2005/115029

PCT Pub. Date: Dec. 1, 2005

(65) Prior Publication Data

US 2007/0224999 A1    Sep. 27, 2007

(30) Foreign Application Priority Data

May 19, 2004   (EP)   ................................. 04102223

(51) Int. Cl.
*H04M 3/42* (2006.01)
(52) U.S. Cl. ..................... 455/417; 455/435.2; 455/422
(58) Field of Classification Search .............. 455/435.2, 455/422.1, 417
See application file for complete search history.

(56) References Cited

U.S. PATENT DOCUMENTS

| 4,658,416 A | 4/1987 | Tanaka | |
|---|---|---|---|
| 2005/0148353 A1* | 7/2005 | Hicks et al. | 455/466 |

FOREIGN PATENT DOCUMENTS

| DE | 101 27 265 | 4/2002 |
|---|---|---|
| WO | 02/51170 | 6/2002 |

* cited by examiner

*Primary Examiner*—Charles N Appiah
*Assistant Examiner*—Randy Peaches
(74) *Attorney, Agent, or Firm*—Oblon, Spivak, McClelland, Maier & Neustadt, L.L.P.

(57) ABSTRACT

A method and a system for automated call diversion of calls intended for a mobile radio device to a second network connection. A detection module of a customer premises equipment detects the mobile radio device as soon as it is located in the sphere of influence of an interface between the mobile radio device and the customer premises equipment, whereby identification data of the mobile radio device are transmitted via the interface. Based on the identification data of the mobile radio device, call diversion of calls intended for the mobile radio device to the second network device is activated as long as the mobile radio device is located in the sphere of influence of the interface between the mobile radio device and the customer premises equipment.

12 Claims, 1 Drawing Sheet

METHOD AND SYSTEM FOR AUTOMATED CALL DIVERSION

Figure 1:
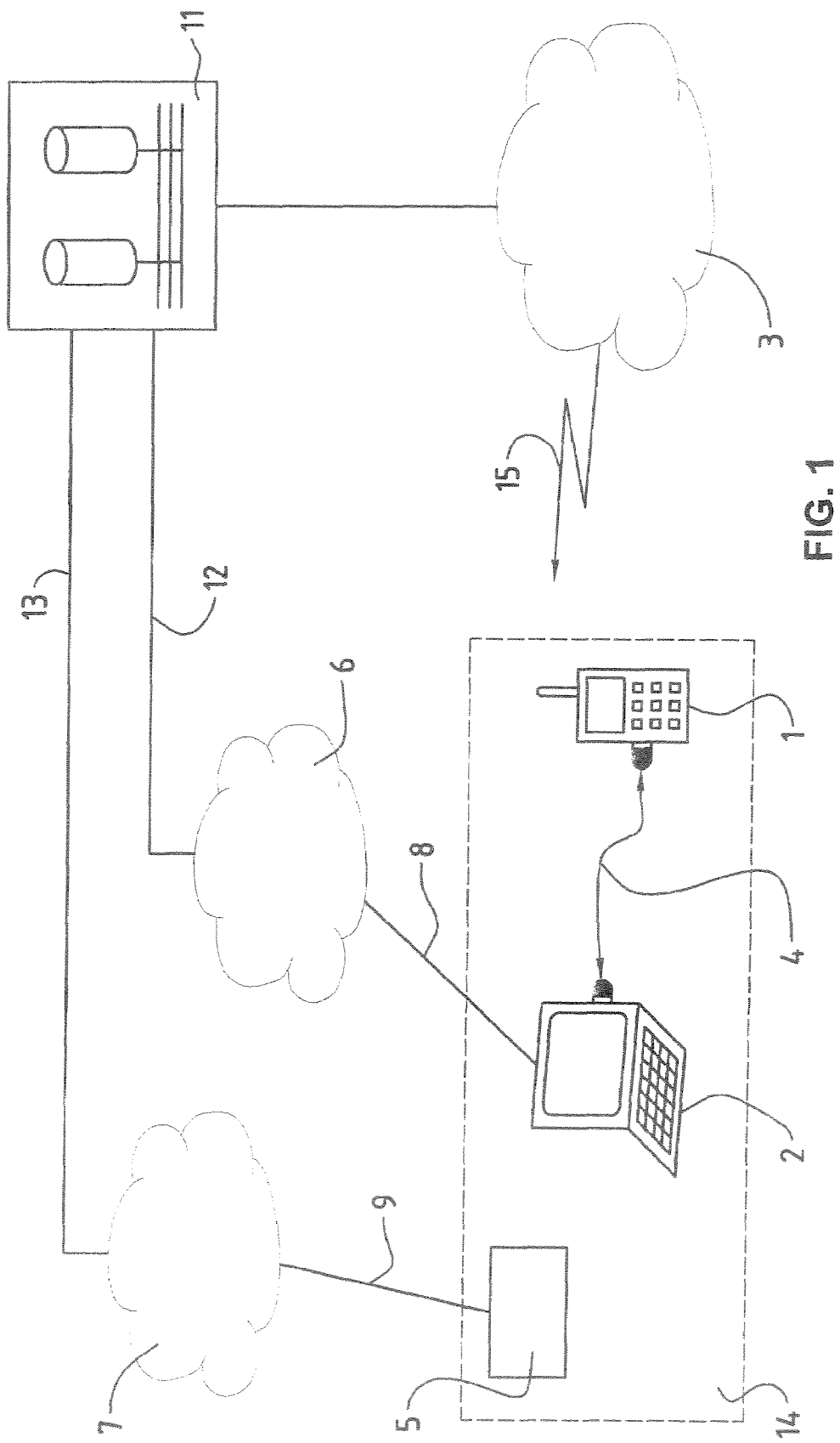

The present invention relates to a method and a system for automatic call diversion or call forwarding to a second network device of calls intended for a mobile radio device.

In recent years the number of mobile radio device users has grown rapidly. In the meantime many persons possess network devices, which are connected via a fixed network, such as e.g. a fixed network device at home or in their business, as well as a mobile radio device. Methods and systems of call diversion or forwarding are thus known in various embodiment variants, such as e.g. call diversion from a fixed network device to a second fixed network device, or call diversion from a mobile radio device to a second fixed network device. Known from the patent publication U.S. Pat. No. 6,446,127 B1 is a method, for example, in which a user of a Personal Information Device (PID) is able to transmit data to a central unit of a telephone network, a call diversion of incoming calls taking place on the basis of these data. A drawback of this method is, however, that the user has to administrate the activation of a call diversion himself, and that he can forget, for example, to switch off again an activated call diversion.

Described in the patent application DE 101 27 265 is a method for forwarding of calls, a first telephone and a second telephone being connectible to a network, and a call diversion being activated by means of the first or the second telephone as soon as the first telephone is connectible to the second telephone via a direct connection (such as e.g. via a Bluetooth connection). This configuration has in particular the drawback, however, that the method is only feasible with telephones that are directly connectible to one another. This prerequisite is not fulfilled for a very large number of installed telephones, however.

The patent application WO 02/51170 relates to a radio telephone, the radio telephone being set up to communicate with a compatible radio telephone over a telecommunications network, the radio telephone comprising a detector for detection and identification of a compatible radio telephone, and the radio telephone comprising a controller, with which calls to the compatible radio telephone are transferable to the radio telephone. Such a radio telephone has the drawback, however, that only calls to compatible radio telephones are transferable to the radio telephone. Such a radio telephone therefore has a very limited application.

It is an object of the present invention to propose a method and system not having the drawbacks of the state of the art for automatic call diversion or forwarding of calls intended for a mobile radio device to a second network device.

According to the present invention, these objects are achieved in particular in that a detection module detects the mobile radio device as soon as it is located in the range of activity of an interface between the mobile radio device and a CPE (Customer Premises Equipment) of a third communication network, and in that identification data of the mobile radio device are transmitted via the interface between the mobile radio device and the CPE, and in that, based on identification data of the mobile radio device, via the third communication network, the call diversion to the second network device of calls intended for the mobile radio device is activated as long as the mobile radio device is located in the range of activity of the interface between the mobile radio device and the CPE. Such a method has the advantage that both the activation and the deactivation of the call diversion takes place automatically.

In an embodiment variant identification data of the mobile radio device and/or identification data of the second network device are transmitted via a network interface between the CPE and at least one central unit of the mobile radio network assigned to the mobile radio device. Such a method has the advantage that the activation or respectively deactivation of the call diversion can also take place when the mobile radio device has no network connection to the mobile radio network, as can be the case in a cellar, for instance. In the example of a cellar, the call diversion can take place on a fixed network device installed in this cellar, for instance.

According to the invention, the detection of the mobile radio device takes place through a detection module which is installed in the CPE. Such a method has the advantage that existing electronic devices can be used for adding the detection module.

In an embodiment variant, identification data of the second network device are transmitted via the interface between the mobile radio device and the CPE. Such a method has the advantage that the call diversion can take place according to a list configured on the mobile radio device, whereby the user of the mobile radio device, for example, can configure the call diversion independently.

In an embodiment variant, identification data of the CPE are transmitted via the interface between the mobile radio device and the CPE. Such a method has the advantage that a list can be configured, for instance in the mobile radio device, with identification entries for different CPEs and for second network devices assigned to these CPE, whereby different call diversions can also be independently configured by the user, for example for different CPEs.

In an embodiment variant, identification data of the mobile radio device are used for outgoing calls of the second network device. To this end, identification data of the mobile radio device of the second network device can be transmitted via a Bluetooth interface or another interface to the second network device, whereby outgoing calls of the second network device can be carried out using identification data of the mobile radio device. The second network device can thereby include, for instance, a memory module such as e.g. a SIM (Subscriber Identity Module). Such a method has the advantage that a call that is carried out using the second network device can be billed using the number of the mobile radio device, for instance.

In an embodiment variant, the method for call diversion relates to call diversion of calls intended for a first network device to a second network device, a detection module of a CPE (Customer Premises Equipment) detecting the mobile radio device as soon as it is located in the range of activity of an interface between the mobile radio device and the CPE, and identification data of the mobile radio device being transmitted via the interface between the mobile radio device and the CPE, and, based on identification data of the mobile radio device, the call diversion of calls intended for the first network device to the second network device being activated as long as the mobile radio device is located in the range of activity of the interface between the mobile radio device and the CPE. Such a method has the advantage that the call diversion from a first fixed network number to a second fixed network number can take place automatically, for example.

In an embodiment variant of the method for call diversion, the activation or respectively deactivation of the call diversion takes place via a network interface between the Customer Premises Equipment (2) and at least one central unit of a telecommunications network. Such a method has the advantage that call diversion can be activated or respectively deactivated even without connection of the mobile radio device to the mobile radio network.

In an embodiment variant of the method for call diversion, the activation or respectively deactivation of the call diversion takes place via a network interface between the mobile radio device (1) and at least one central unit of a telecommunications network. Such a method has the advantage that call diversion can be activated or respectively deactivated even without connection of the Customer Premises Equipment to a telecommunications network.

It should be stated here that, besides the method according to the invention, the present invention also relates to a system for carrying out this method.

Embodiment variants of the present invention will be described in the following with reference to examples; the examples of the embodiments are illustrated by the following attached figure:

FIG. 1 shows a block diagram illustrating schematically a method and a system for automatic, temporary call diversion of calls intended for a mobile radio device to a fixed network number.

The reference numeral 1 in FIG. 1 refers to a mobile radio device. and the reference numeral 2 refers to a CPE (Customer Premises Equipment). The mobile radio device 1 can be any mobile radio device of any mobile radio network 3; for example, the mobile radio device is a GSM device of a GSM mobile radio network, or a UMTS device of a UMTS network, or a satellite device of a satellite network. The CPE 2 can be an ordinary standard personal computer (PC), a portable PC, an analog or digital modem, an xDSL modem (whereby the xDSL modem can be an ADSL, SDSL, HDSL or VDSL modem), a fixed network telephone, a recharger for a mobile radio device, a refrigerator or any other device with electronically linked components.

The reference numeral 4 in FIG. 1 refers to an interface between the mobile radio device and the CPE 2. The interface 4 can be a Bluetooth interface, an infrared interface, a WLAN interface or any other contactless interface. The interface 4 between the mobile radio device 1 and the CPE 2 can also be a USB interface, however, a fire wire interface or any other contacted interface, however. The interface 4 between the mobile radio device and the CPE can in particular also be a contacted interface comprising at the same time, for instance, besides a USB interface, also a power supply, for example for recharging the mobile radio device, or the interface 4 can be an interface for the power supply, for example, which also includes at the same time an interface for transmission of data. It is also possible, for example, for a multiplicity of interfaces to exist simultaneously between the mobile radio device 1 and the CPE 2. By means of the interface 4, a detection module of the CPE 2 can detect the mobile radio device 1, for example, as soon as it is located in the range of activity of the interface 4, for example as soon as it is located in the transmitting/receiving range of a contactless interface such as a Bluetooth interface, or as soon as it is plugged in by means of a contacted interface such as a USB interface. Through the transmission of identification data of the mobile radio device via such an interface, the mobile radio device 1 can be identified, for instance by means of a service applet of the CPE 2, described further below. The identification data can comprise, for example, an identifier of a service applet of the mobile radio device, the call number of the mobile radio device, the International Mobile Equipment Identity (IMEI), the International Mobile Subscriber Identity (IMSI), or any other indicator for identification of the mobile radio device. The identification data can be stored e.g. on a memory module such as an SIM card, for instance.

The reference numeral 5 in FIG. 1 refers to a second network device. The second network device 5 can be, for example, a fixed net telephone, a house telephone, a mobile house telephone, an Internet telephone, or any other network device for voice and/or data communication. The second network device 5 can also be integrated in the CPE 2, for example, as an Internet telephone application for a PC. As mentioned above, the CPE 2 can also be a fixed net telephone with a Bluetooth interface, for instance. The CPE 2 can also be designed, however, as e.g. an auxiliary device that can be plugged into the wall socket for the fixed net telephone or in an electrical outlet of a power supply network. The CPE 2 can also be a Power Line Communications (PLC) device, for instance, with a communication device for communication over the power supply network.

The reference numerals 6 and 7 in FIG. 1 refer to any telecommunications networks. The telecommunications networks 6, 7 can be, for instance, a Public Switched Telephone Network (PSTN), an internet based on networks such as Ethernet, WLAN, Bluetooth, Token Ring, for instance, or analog or digitally connected modem or xDSL modem, a land-based or satellite-based mobile radio network, a power-supply-network-based PLC network, or any other telecommunications network. In an embodiment variant, it can be advantageous for the telecommunications networks 6 and 7 not to be separate networks, but to be instead only a single telecommunications network, and to be implemented only as PSTN, for instance.

The reference numerals 8 and 9 in FIG. 1 refer to the network connection of the CPE 2 to the telecommunications network 6, or respectively to the network connection of the second network device 5 to the telecommunications network 7. The network connections can comprise any connections to a PSTN, to an internet to a mobile radio network, or any other telecommunications network.

The reference numeral 11 in FIG. 1 relates to a central unit 11 of the mobile radio networks assigned to the mobile radio device. The central unit 11 can comprise, for example, a Home Location Register (HLR), a Visiting Location Register (VLR), a Mobile Switching Centre (MSC) and/or a corresponding register.

In FIG. 1, the reference numeral 12 or respectively 13 refers to a network connection between the telecommunications network 6 and the central unit 11 or respectively between the telecommunications network 7 and the central unit 11.

The reference numeral 14 in FIG. 1 refers to the activity range 14 of the interface between the mobile radio device 1 and the CPE 2. The reference numeral 15 refers to the transmitting/receiving area 15 of the mobile radio device/mobile radio network. In an embodiment variant, the mobile radio device 1 is located in the activity range 14 of the interface between the mobile radio device 1 and the CPE 2, but it is outside the transmitting/receiving area 15 of the mobile radio device/mobile radio network.

In an embodiment variant of the solution according to the invention, so-called service applets are provided, for example via a service URL of the mobile radio network operator. Service applets are provided in pairs, for instance, e.g. with identification data assigned in pairs as service applet for a mobile radio device and as service applet for a CPE, and can be loaded by a user onto a mobile radio device 1 and on to a CPE 2 in each case. For example, the service applet of the CPE 2 can comprise a detection module the mobile radio device being detected as soon as it is located in the activity range 14 of an interface between the mobile radio device and the CPE. Then the service applet of the CPE can request identification data from the service applet of the mobile radio device, for example, and, in accordance with this identification data, activate the call diversion of calls intended for the mobile radio device 1 to a second network device 5 as long as the mobile radio device 1 is located in the activity range 14 of the interface between the mobile radio device and the CPE.

The service applet of the CPE can contain, for instance, a list with entries of identification data of mobile radio devices and with identification data of second network devices. Such a list can also be configured, however, on the mobile radio device, or it can also be configured on a central unit of a telecommunications network, for example. Such a list can also be generated dynamically, however, by the CPE detecting via a suitable interface, for instance, whether suitable second network devices are available.

The service applet of the CPE can then activate or deactivate, for example in the Home Location Register (HLR), in the Visiting Location Register (VLR) and/or in a corresponding register, a call diversion for calls intended for a mobile radio device to a second network device, using identification data of the mobile radio device and identification data of second network devices.

To determine whether a deactivation of call diversion is necessary, a deactivation module can be provided, for example in a central unit 11 of the mobile radio network assigned to the mobile radio device, the deactivation module asking at certain points in time, such as e.g. after passage of a certain time interval, the service applet of the CPE, for instance, to confirm the validity of the current call diversion. A deactivation can also be triggered by the service applet of the CPE, however, as soon as the mobile radio device is no longer located in the range of activity of the interface 4.

It is to be pointed out that an RFID (Radio Frequency IDentification) transceiver for detection of RFID transponders can be used instead of a detection module for detecting a mobile radio device. The RFID transceiver can activate call diversion as soon as a particular RFID transponder (which can also be referred to as an RFID tag) is detected, for example. The RFID transponder can also be used by the user for other purposes, such as access control, time monitoring, or any other application, for instance. The RFID transceiver can be set up in such a way, for example, that the RFID tags are detected over greater distances, for example within a particular range. The RFID transceiver can also be set up such that RFID tags are only detected over shorter distances, for example, so that a user has to place the RFID tag on the RFID transponder at short-term notice for activation of call diversion. The call diversion can remain activated as long as a particular RFID tag is detectable by the RFID transceiver, for example. Call diversion can also be activated upon first detection of a particular RFID tag, for instance, and be deactivated again upon second detection of this RFID tag. Call diversion can also be activated upon detection of a first RFID tag, and be deactivated again upon detection of a second RFID tag, for example.

The invention claimed is:

1. A method for automated call diversion of calls intended for a mobile radio device to a second network device of a second communication network, wherein
   detecting the mobile radio device by a detection module of a customer premises equipment (CPE), as soon as the mobile radio device is located in an activity range of an interface between the mobile radio device and the CPE of a third communication network,
   transmitting identification data of the mobile radio device via the interface between the mobile radio device and the CPE of the third communication network, and
   activating call diversion of calls intended for the mobile radio device, based on the identification data of the mobile radio device located at the CPE, to the second network device as long as the mobile radio device is located in the activity range of the interface between the mobile radio device and the CPE.

2. The method according to claim 1, further comprising the step of:
   transmitting at least one of the identification data of the mobile radio device or identification data of the second network device via a network interface between the CPE and at least one central unit of the mobile radio network assigned to the mobile radio device to manage the call diversion at the at least one central unit.

3. The method according to claim 1, further comprising the step of:
   transmitting identification data of the second network device via the interface between the mobile radio device and the CPE.

4. The method according to claim 1, further comprising the step of:
   transmitting identification data of the CPE via the interface between the mobile radio device and the CPE.

5. The method according to claim 1, further comprising the step of:
   using the identification data of the mobile radio device for outgoing calls made from the second network device.

6. The method according to claim 1, wherein said step of activating call diversion further comprises:
   managing a call diversion status of the mobile radio device at a central unit of the mobile radio network assigned to the mobile radio device, by receiving information from the CPE on a status of whether or not the mobile radio device is located in the activity range of the interface between the mobile radio device and the CPE.

7. A system for automated call diversion of calls intended for a mobile radio device to a second network device of a second communication network, comprising:
   a customer premises equipment (CPE), having a detection module of a third communication network, the detection module including means for detecting at least one available interface between the mobile radio device and the CPE,
   means for transmitting identification data of the mobile radio device via the interface between the mobile radio device and the CPE, and
   means based on the identification data located at the CPE for call diversion of calls intended for the mobile radio device to the second network device.

8. The system according to claim 7, wherein the CPE comprises means for transmitting at least one of the identification data of the mobile radio device or identification data of the second network device to at least one central unit of the mobile radio network assigned to the mobile radio device to manage the call diversion at the at least one central unit.

9. The system according to claim 7, the system further comprising:
   means for transmitting identification data of the second network device via the interface between the mobile radio device and the CPE.

10. The system according to claim 7, wherein the system comprises means for transmitting identification data of the CPE via the interface between the mobile radio device and the CPE.

11. The system according to claim 7, the system further comprising:
   means for using the identification data of the mobile radio device for outgoing calls of the second network device.

12. The system according to claim 7, further comprising:
a central unit of the mobile radio network that is assigned to the mobile radio device, configured to manage a call diversion status of the mobile radio device, by receiving information from the CPE on a status of whether or not the mobile radio device is located in the activity range of the interface between the mobile radio device and the CPE.

* * * * *

UNITED STATES PATENT AND TRADEMARK OFFICE
CERTIFICATE OF CORRECTION

| | |
|---|---|
| PATENT NO. | : 7,711,356 B2 |
| APPLICATION NO. | : 11/569259 |
| DATED | : May 4, 2010 |
| INVENTOR(S) | : Rudolf Ritter |

It is certified that error appears in the above-identified patent and that said Letters Patent is hereby corrected as shown below:

On the title page, Item (73), the Assignee should read:

-- (73) Assignee: -- Swisscom AG, Bern (CH) --

Signed and Sealed this

Twenty-sixth Day of October, 2010

David J. Kappos
*Director of the United States Patent and Trademark Office*